US008276257B2

(12) United States Patent
Lam et al.

(10) Patent No.: US 8,276,257 B2
(45) Date of Patent: Oct. 2, 2012

(54) METHOD FOR MAKING COPLANAR WRITE HEAD POLE TIPS

(75) Inventors: Terence Tin-Lok Lam, Cupertino, CA (US); Vladimir Nikitin, Campbell, CA (US); Changqing Shi, San Jose, CA (US); Samuel Yuan, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 2098 days.

(21) Appl. No.: 10/903,973

(22) Filed: Jul. 30, 2004

(65) Prior Publication Data

US 2006/0023353 A1 Feb. 2, 2006

(51) Int. Cl.
*G11B 5/127* (2006.01)
*H04R 31/00* (2006.01)

(52) U.S. Cl. ............... 29/603.14; 29/603.12; 29/603.13; 29/603.16; 29/603.18; 216/62; 216/66; 216/67; 360/121; 360/122; 360/317; 451/5; 451/41

(58) Field of Classification Search .. 29/603.13–603.16, 29/603.18; 216/62, 66, 67; 360/122, 126, 360/317; 427/127, 128; 451/5, 41
See application file for complete search history.

(56) References Cited

U.S. PATENT DOCUMENTS

| 4,485,419 A | 11/1984 | Vinal |
| 4,601,099 A | 7/1986 | Nishiyama |
| 5,196,976 A | 3/1993 | Lazzari |
| 5,274,521 A | 12/1993 | Miyauchi et al. |
| 5,452,165 A | 9/1995 | Chen et al. |
| 5,488,528 A | 1/1996 | Chen et al. |
| 6,073,338 A | 6/2000 | Liu et al. |
| 6,212,047 B1 | 4/2001 | Payne et al. |
| 6,289,578 B1 * | 9/2001 | Kamijima ............... 29/603.14 |
| 6,295,187 B1 | 9/2001 | Pinarbasi |
| 6,459,552 B1 | 10/2002 | Liu et al. |
| 6,678,117 B2 * | 1/2004 | Santini ................ 360/125.5 |
| 6,857,181 B2 * | 2/2005 | Lo et al. .................. 29/603.15 |
| 2002/0093761 A1 | 7/2002 | Payne et al. |

FOREIGN PATENT DOCUMENTS

| JP | 150422 | 12/1975 |
| JP | 51150315 | 12/1976 |
| JP | 142424 | 9/1982 |
| JP | 62141619 | 6/1987 |
| JP | 63138512 | 6/1988 |
| JP | 63224016 | 9/1988 |
| JP | 7302407 | 11/1995 |

* cited by examiner

*Primary Examiner* — Paul D Kim
(74) *Attorney, Agent, or Firm* — Merchant & Gould

(57) ABSTRACT

A method and apparatus for providing a write head having well-defined, precise write head pole tips. A coplanar write head pole tip processing method provides a thin-film magnetic write head pole tip layer and defines first and second pole tips from the pole tip layer. When the pole tips are provided on a write head, a write gap can be defined using ion milling, E-beam lithography, FAB or can be deposited. The write head pole tips can be used in conjunction with read heads by merging a read head with a write head or a read head can be bonded to a write head in a piggybacked fashion.

16 Claims, 12 Drawing Sheets

Arrangement of devices on a wafer

Rows of heads on wafer 2D view of head 3D view of head

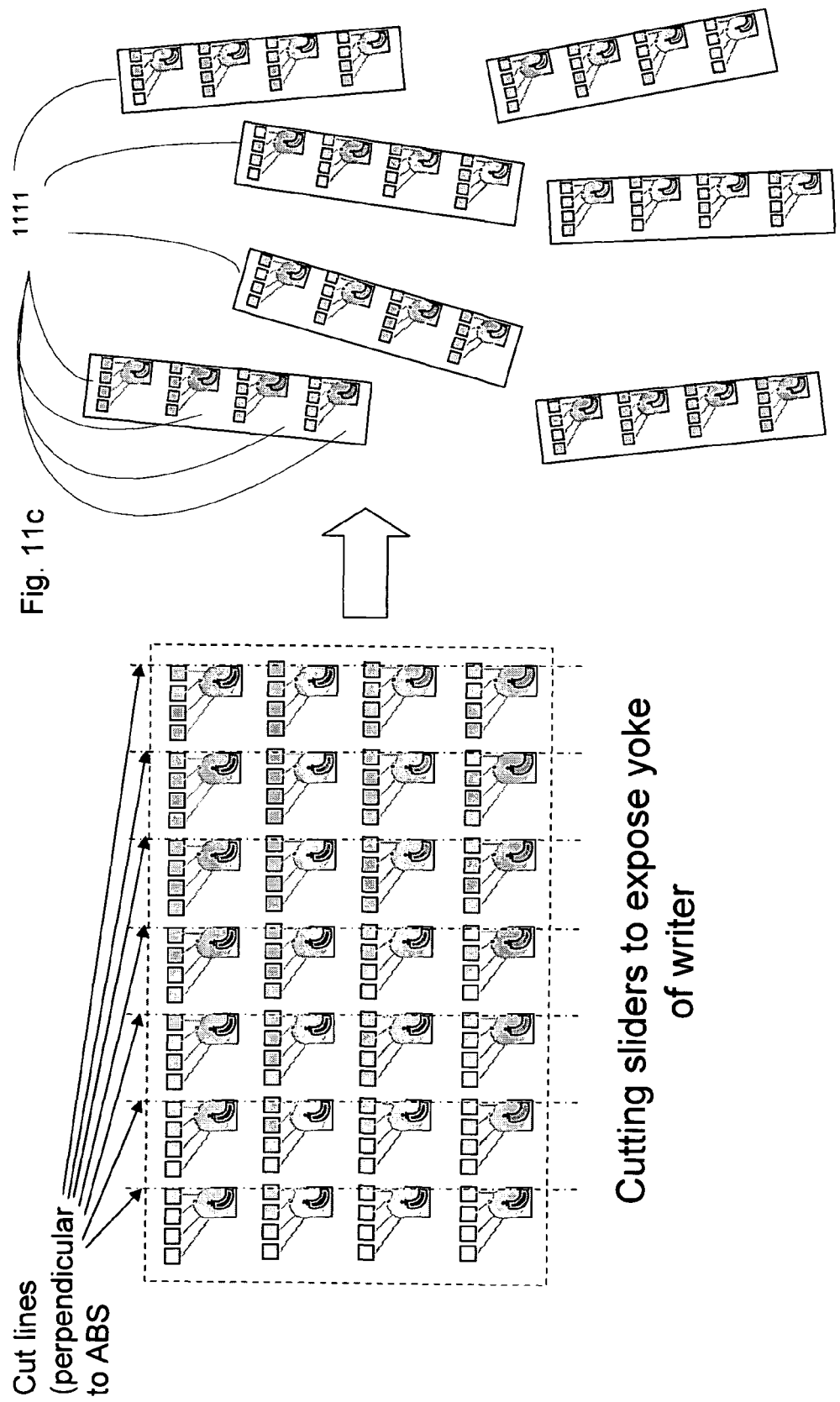

Fab process of sliders (II)
Fig. 11d
Rows lined up and glued together
Planarization using polishing tool, followed by pole tip deposition
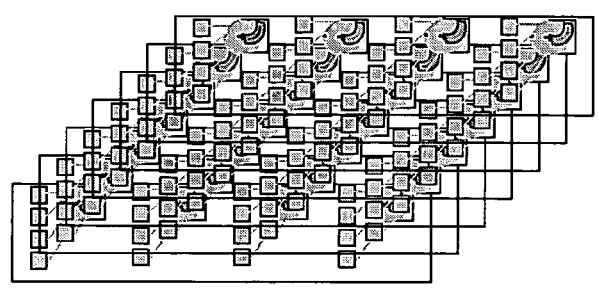
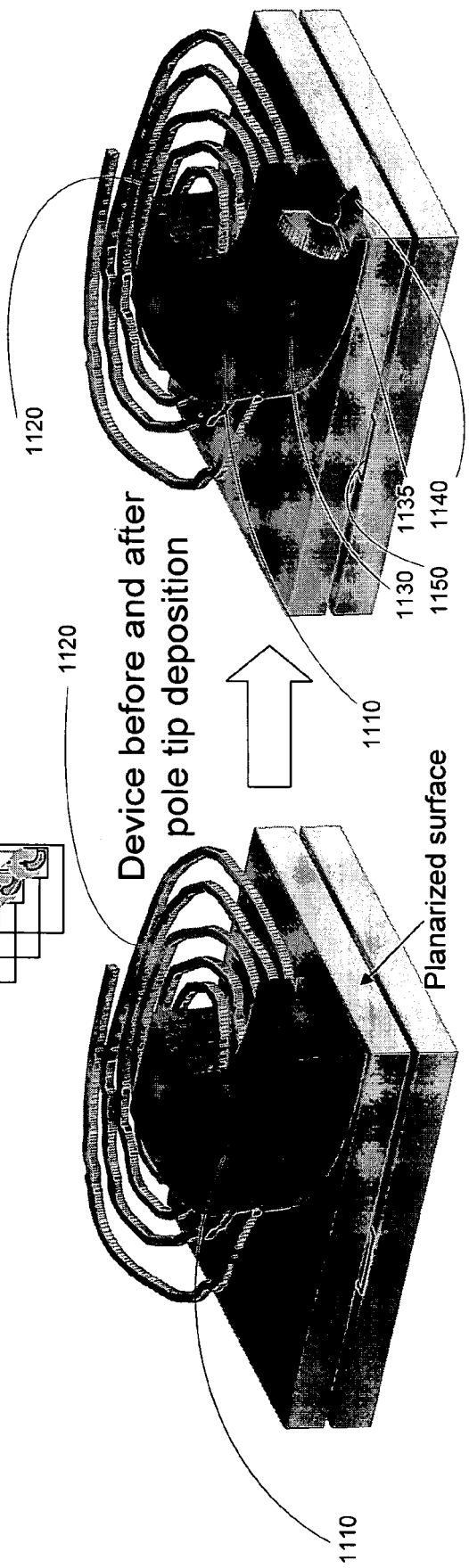
Fig. 11e

METHOD FOR MAKING COPLANAR WRITE HEAD POLE TIPS

FIELD OF THE INVENTION

This invention relates in general to magnetic recording systems, and more particularly to a method and apparatus for providing a write head having well-defined, precise write head pole tips.

DESCRIPTION OF RELATED ART

Fixed magnetic storage systems are now commonplace as a main non-volatile storage in modem personal computers, workstations, and portable computers. Storage systems are now capable of storing gigabyte quantities of digital data, even when implemented in portable computers.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advance in magnetic head technology has led to heads fabricated using processes similar to those used in the manufacture of semiconductor devices.

A typical disk drive is comprised of a magnetic recording medium in the form of a disk for storing information, and a magnetic read/write head for reading or writing information on the disk. The disk rotates on a spindle controlled by a drive motor and the magnetic read/write head is attached to a slider supported above the disk by an actuator arm. When the disk rotates at high speed a cushion of moving air is formed lifting the air bearing surface (ABS) of the magnetic read/write head above the surface of the disk.

The read portion of the head is typically formed using a magnetoresistive (MR) element. This element is a layered structure with one or more layers of material exhibiting the magnetoresistive effect. The resistance of a magnetoresistive element changes when the element is in the presence of a magnetic field. Data bits are stored on the disk as small, magnetized region on the disk. As the disk passes by beneath the surface of the magnetoresistive material in the read head, the resistance of the material changes and this change is sensed by the disk drive control circuitry.

The write portion of a read/write head is typically fabricated using a coil embedded in an insulator between a top and bottom magnetic layer. The magnetic layers are arranged as a magnetic circuit, with pole tips forming a magnetic gap at the air bearing surface of the head. When a data bit is to be written to the disk, the disk drive circuitry sends current through the coil creating a magnetic flux. The magnetic layers provide a path for the flux and a magnetic field generated at the pole tips magnetizes a small portion of the magnetic disk, thereby storing a data bit on the disk.

A thin film write head comprises two pole pieces, a top pole piece P1 and a bottom pole piece P2. A write head generally has two regions, denoted a pole tip region and a back region. The pole pieces are formed from thin magnetic material films and converge in the pole tip region at a magnetic recording gap, known as the zero throat level, and in the back region at a back gap. The zero throat level delineates the pole tip region and back region. A write head also has two pole tips, P1T and P2T, associated with and extensions of P1 and P2 respectively. The pole tips, which are relatively defined in their shape and size in contrast to the pole pieces, are separated by a thin layer of insulation material such as alumina, referred to as a gap. As a magnetic disk is spinning beneath a write head, the P2 pole tip trails the P1 pole tip and is therefore the last to induce flux on the disk. Thus, the P2T dimension predominantly defines the write track width of the write head, and is generally considered an important feature. The write track width, P2B, is especially important because it limits the areal density of a magnetic disk. A narrower track width translates to greater tracks per inch (TP1) written on the disk, which in turn translates to greater areal density.

Processes for fabricating the write portion of a read/write head typically include steps that define the width of pole tips to a large degree of inaccuracy, resulting in large yield losses. This problem will be worse for the next generation of write heads since the sigma on the P2 width (P2B) does not scale with width itself. Sigma values, or the standard deviation of the transducer elements, represent greater precision in manufacturing. Additionally, the processes used limit the capability of head design because P1 and P2 poles are not symmetric, limiting the control of the PIP saturation. Furthermore, higher notch depth limits the maximum height of P2. Slight differences between the P1 notch and P2B cause excessive erase bands. Moreover, flare control is not well-defined due to shape variations of photo-resist along the plated direction.

It can be seen that there is a need for a method and apparatus for providing a write head having well-defined, precise write head pole tips.

SUMMARY OF THE INVENTION

To overcome the limitations in the prior art described above, and to overcome other limitations that will become apparent upon reading and understanding the present specification, the present invention discloses a method and apparatus for providing a write head having well-defined, precise write head pole tips.

The present invention solves the above-described problems by defining first and second pole tips from a pole tip layer. When the pole tips are provided on a write head, a write gap can be defined using ion milling, E-beam lithography, FAB or can be deposited. The write head pole tips can be used in conjunction with read heads by merging a read head with a write head or a read head can be bonded to a write head in a piggybacked fashion.

A method in accordance with an embodiment of the present invention includes forming a thin-film magnetic write head pole tip layer, the write head pole tip layer having a thickness defining a track width and defining a first pole tip and a second pole tip from the pole tip layer.

In another embodiment of the present invention, a method for making a coplanar magnetic write head is provided. This method includes magnetically coupling a thin-film magnetic write head pole tip layer to a yoke, the write head pole tip layer having a thickness defining a track width, defining a first and second pole tip from the pole tip layer and defining a write gap between the first and second pole tip formed from the pole tip layer.

In another embodiment of the present invention, another method for making a coplanar magnetic write head is provided. This method includes forming a yoke for a write head, depositing a pole tip layer on the yoke, the pole tip layer having a thickness defining a track width, defining a first and second pole tip and a write gap between the first and second pole tip from the pole tip layer and forming a read head having a read gap, wherein the forming the read head further comprises forming the read head with the read gap perpendicular to the fist and second pole tips.

In another embodiment of the present invention, another method for making a coplanar magnetic write head is provided. This method includes providing on a planar wafer surface a plurality of write heads including a coil and a yoke having an end disposed at a side of the write head, slicing the planar wafer surface perpendicular to an air bearing surface exposing the yoke of each of the plurality of write heads, forming a pole tip layer along the side of the wafer surface having the exposed yokes, the pole tip layer having a thickness defining a track width, defining from the pole tip layer a first and second pole tip for each of the plurality of write heads and defining a write gap between each of the first and second pole tips for each of the plurality of write heads.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 11a-f illustrates another method for fabricating a read/write head according to an embodiment of the present invention.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a write head having well-defined, precise write head pole tips. According to an embodiment of the present invention, first and second pole tips are defined from a pole tip layer. When the pole tips are provided on a write head, a write gap can be defined using ion milling or E-beam lithography.

Figure 1:
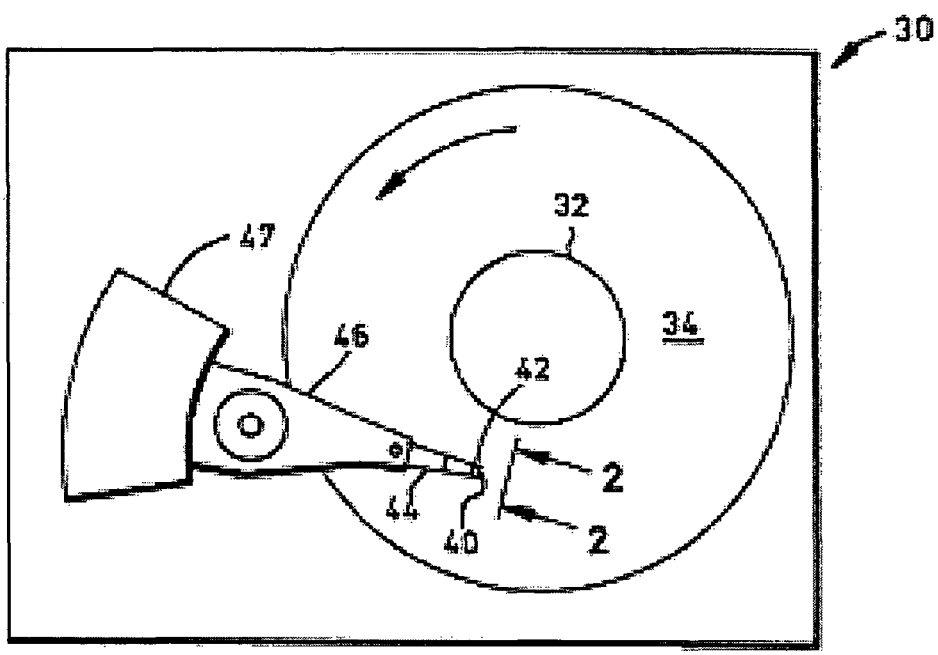
FIG. 1 illustrates a storage system according to the present invention.

FIG. 1 illustrates a storage system 30 according to the present invention. In FIG. 1, a transducer 40 is under control of an actuator 48. The actuator 48 controls the position of the transducer 40. The transducer 40 writes and reads data on magnetic media 34 rotated by a spindle 32. A transducer 40 is mounted on a slider 42 that is supported by a suspension 44 and actuator arm 46. The suspension 44 and actuator arm 46 positions the slider 42 so that the magnetic head 40 is in a transducing relationship with a surface of the magnetic disk 34.

Figure 2:
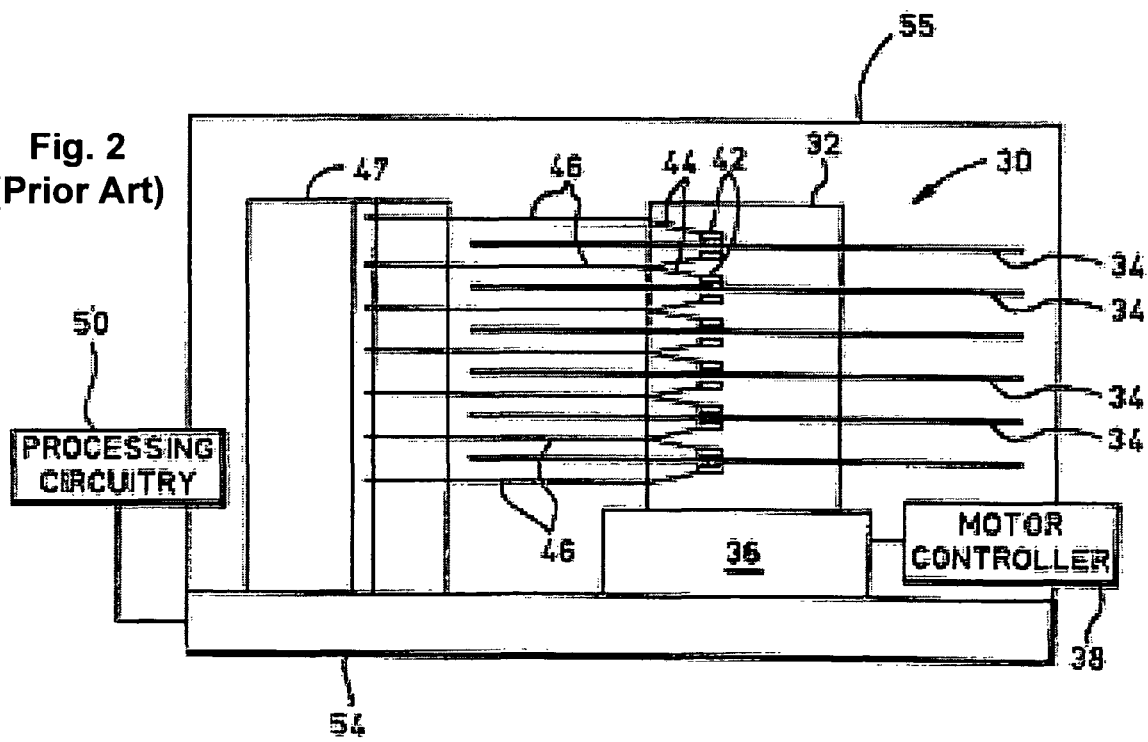
FIG. 2 illustrates one particular embodiment of a storage system according to the present invention.

FIG. 2 illustrates one particular embodiment of a storage system 30 according to the present invention. In FIG. 2, a hard disk drive 30 is shown. The drive 30 includes a spindle 32 that supports and rotates magnetic disks 34. A motor 36, mounted on a frame 54 in a housing 55, which is controlled by a motor controller 38, rotates the spindle 32. A combined read and write magnetic head is mounted on a slider 42 that is supported by a suspension 44 and actuator arm 46. Processing circuitry 50 exchanges signals, representing such information, with the head, provides motor drive signals for rotating the magnetic disks 34, and provides control signals for moving the slider to various tracks. The plurality of disks 34, sliders 42 and suspensions 44 may be employed in a large capacity direct access storage device (DASD).

When the motor 36 rotates the disks 34 the slider 42 is supported on a thin cushion of air (air bearing) between the surface of the disk 34 and the air bearing surface (ABS) 48. The magnetic head may then be employed for writing information to multiple circular tracks on the surface of the disk 34, as well as for reading information therefrom.

Figure 3:
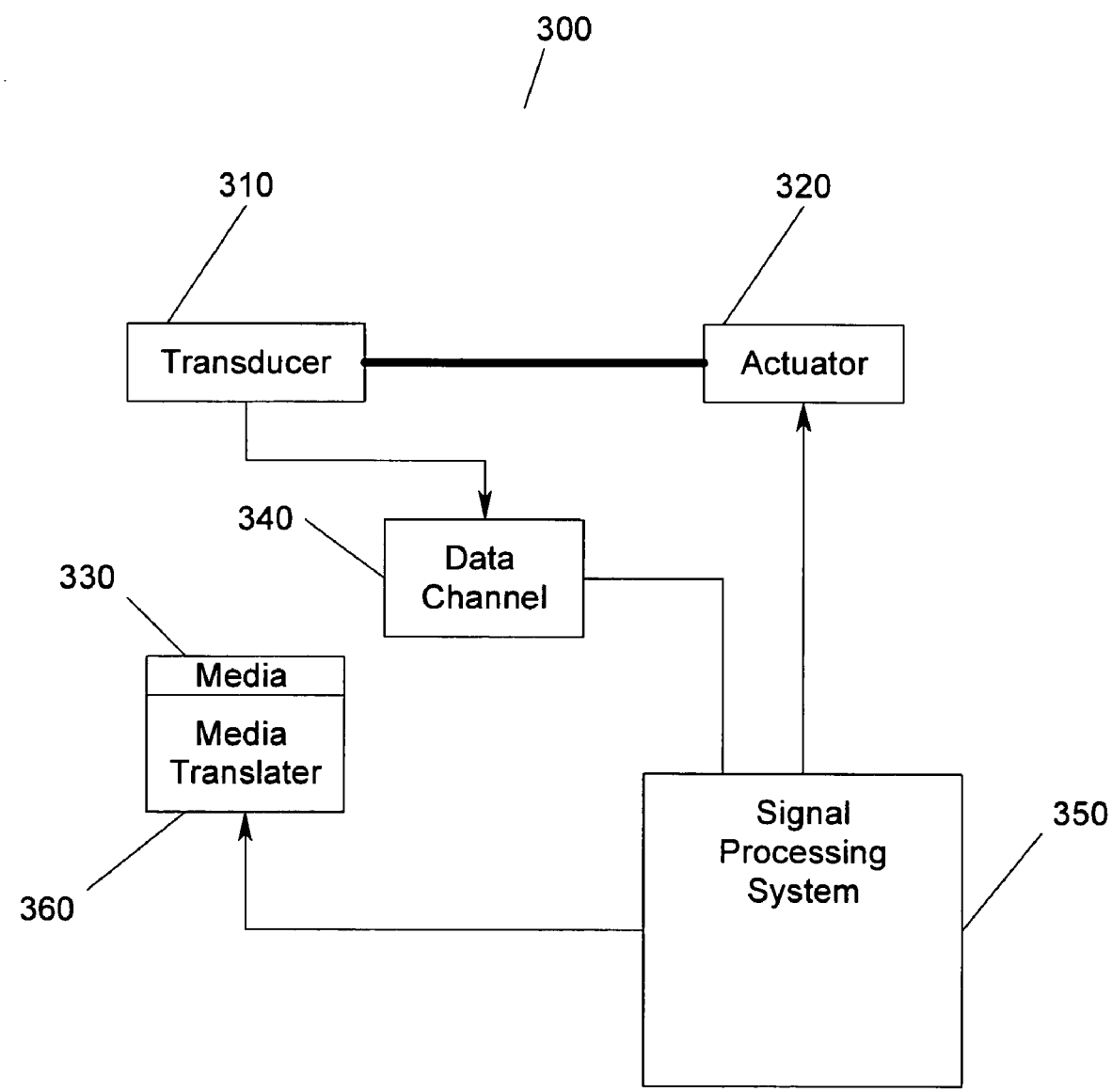
FIG. 3 illustrates a storage system.

FIG. 3 illustrates a storage system 300. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
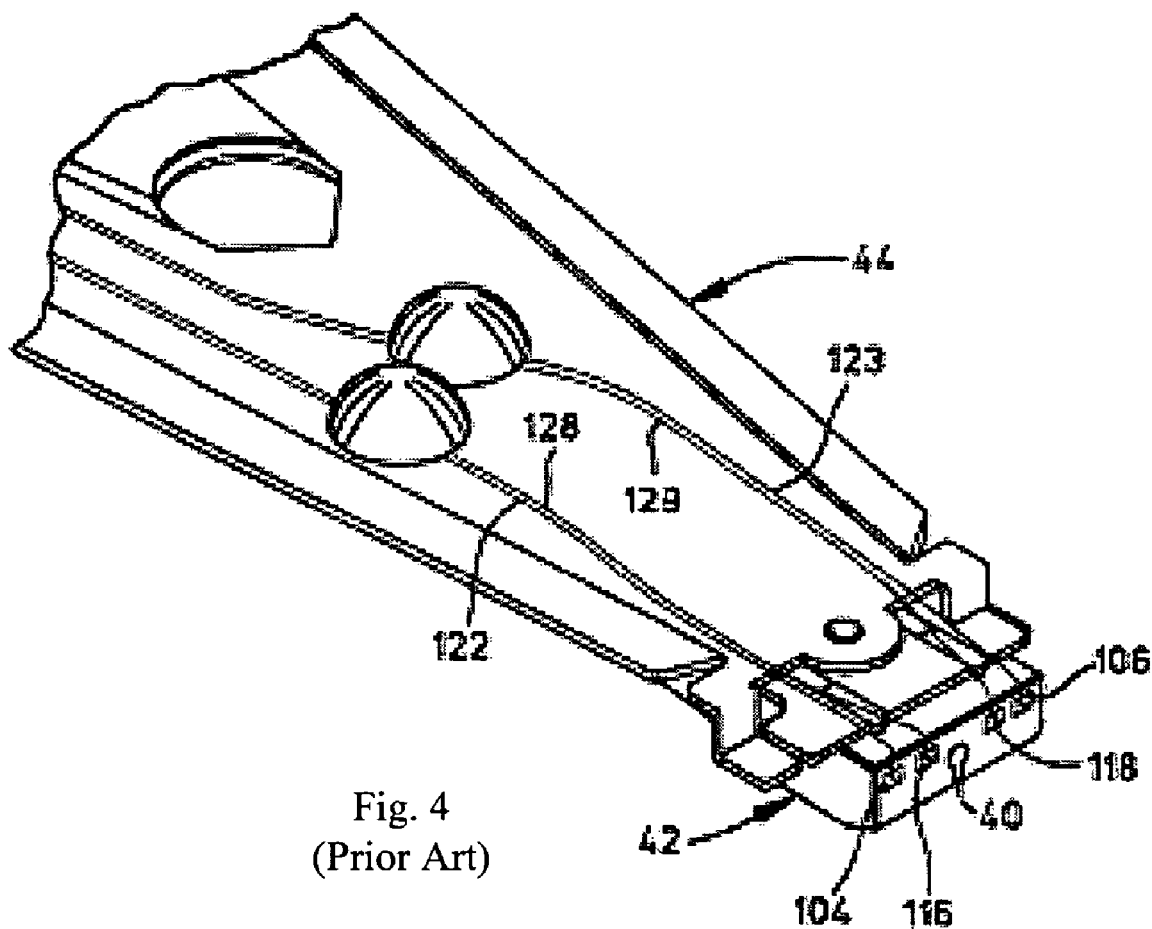
FIG. 4 is an isometric illustration of a suspension system for supporting a slider having a magnetic head mounted thereto.

FIG. 4 is an isometric illustration of a suspension system 400 for supporting a slider 42 having a magnetic head mounted thereto. In FIG. 4 first and second solder connections 104 and 116 connect leads from the sensor 40 to leads 122 and 128 on the suspension 44 and third and fourth solder connections 106 and 118 connect the coil to leads 123 and 129 on the suspension 44. However, the particular locations of connections may vary depending on head design.

Figure 5:
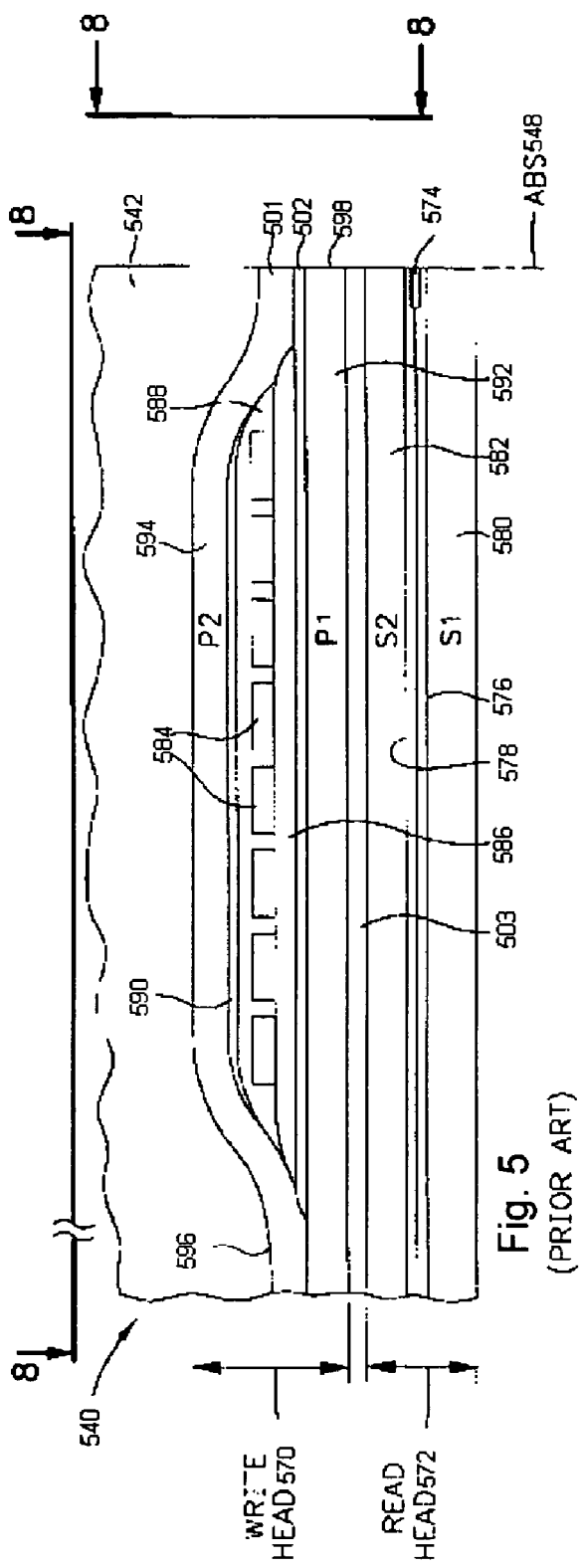
FIGS. 5-7 illustrate a magnetic head according to the prior art.
Figure 7:
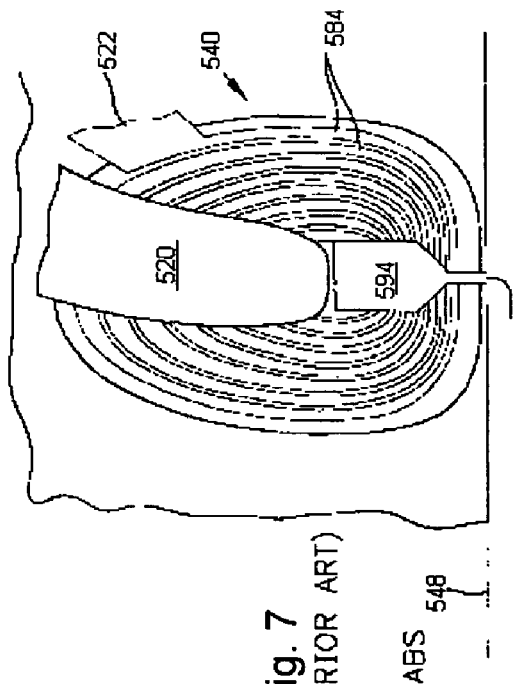
Figure 6:
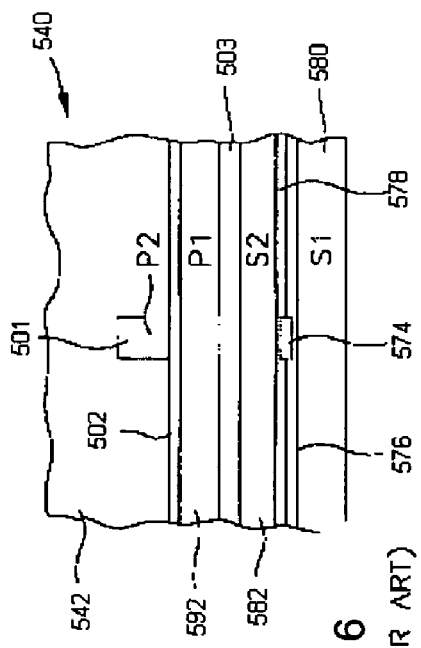

FIGS. 5-7 illustrate a magnetic head according to the prior art. FIGS. 5 and 6 are side cross-sectional elevation view of a magnetic head 540 and an ABS view of the magnetic head 540, respectively. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head."

In response to external magnetic fields, the resistance of the sensor 574 changes. A sense current is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

FIG. 7 illustrates a view of the connect leads 520, 522 coupled to the coil 584 for the write pole piece 594. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

However, as described above, processes for fabricating the write pole portions of a read/write head typically involve a large degree of inaccuracy. This problem worsens because the tolerances for the write poles do not scale with reducing pole tip width for higher density recording. Additionally, the write poles are not symmetric and therefore limit the control of the pole tip saturation. Still other disadvantages for prior write head designs were described above.

According to an embodiment of the present invention, as will be described herein below, pole tip width is determined by the thickness of the pole tip layer, which utilizes vacuum deposition techniques that can be well-controlled. Furthermore, as the pole tip width is getting smaller with new generations of hard disk drives, the thickness control scales with the pole tip width. This is due to the fact the vacuum-deposited film uniformity is proportional to the deposited thickness. Furthermore, according to an embodiment of the present invention, the pole tips can be made symmetric, which allows for better control of the erase bands and pole tip over-saturation. Moreover, pole tip shape can be controlled with high precision using well-established techniques such as optical lithography or e-beam lithography in conjunction with ion milling, or focused ion beam. This allows for precise control of the magnetic flux delivered at the disk surface and control of pole tip saturation.

According to an embodiment of the present invention, there are two main approaches for providing a write head having well-defined, precise write head pole tips. However, there may be various embodiments evolving from the two main approaches. The pole tips need to be perpendicular to the plane of the read gap of the sensor. In the first approach the pole tip plane is parallel to the wafer and the read gap of the sensor is rotated perpendicular to the wafer plane. In the second approach, the read head is deposited in-plane of the wafer (similar to prior art), but the pole tips are rotated 90 degrees out of plane.

Figure 8A:
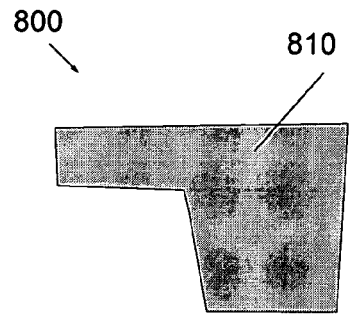
FIGS. 8a-d illustrate steps taken to fabricate a write head according to an embodiment of the present invention.

FIGS. 8a-d illustrate a method 800 for making coplanar magnetic write head pole tips according to an embodiment of the present invention. In FIG. 8a, a first magnetic write head pole or yoke 810 is fabricated on a substrate such as a planar wafer surface having a thin-film deposited thereto. The first magnetic write head pole 810 is electroplated.

Figure 8B:
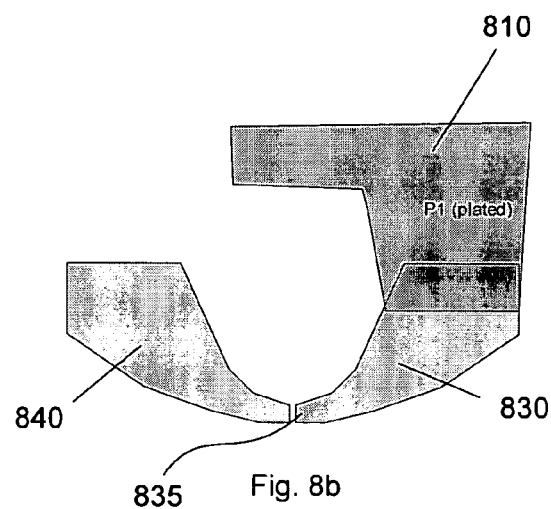

In FIG. 8b, the coplanar pole tips 830, 840 are formed by vacuum-depositing magnetic film CoFe, for example, for a pole tip layer adjacent to and magnetically coupled to a yoke and defining pole tips from the pole tip layer. Coplanar pole tips 830, 840 are defined using photolithography. The pole tip gap 835 may be formed using ion milling, E-beam lithography, or focused ion beam (FIB), for example.

Figure 8C:
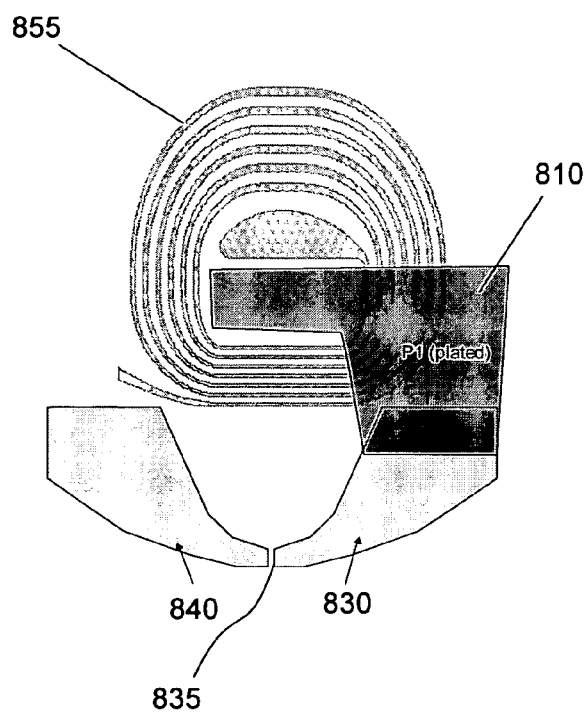
Figure 8D:
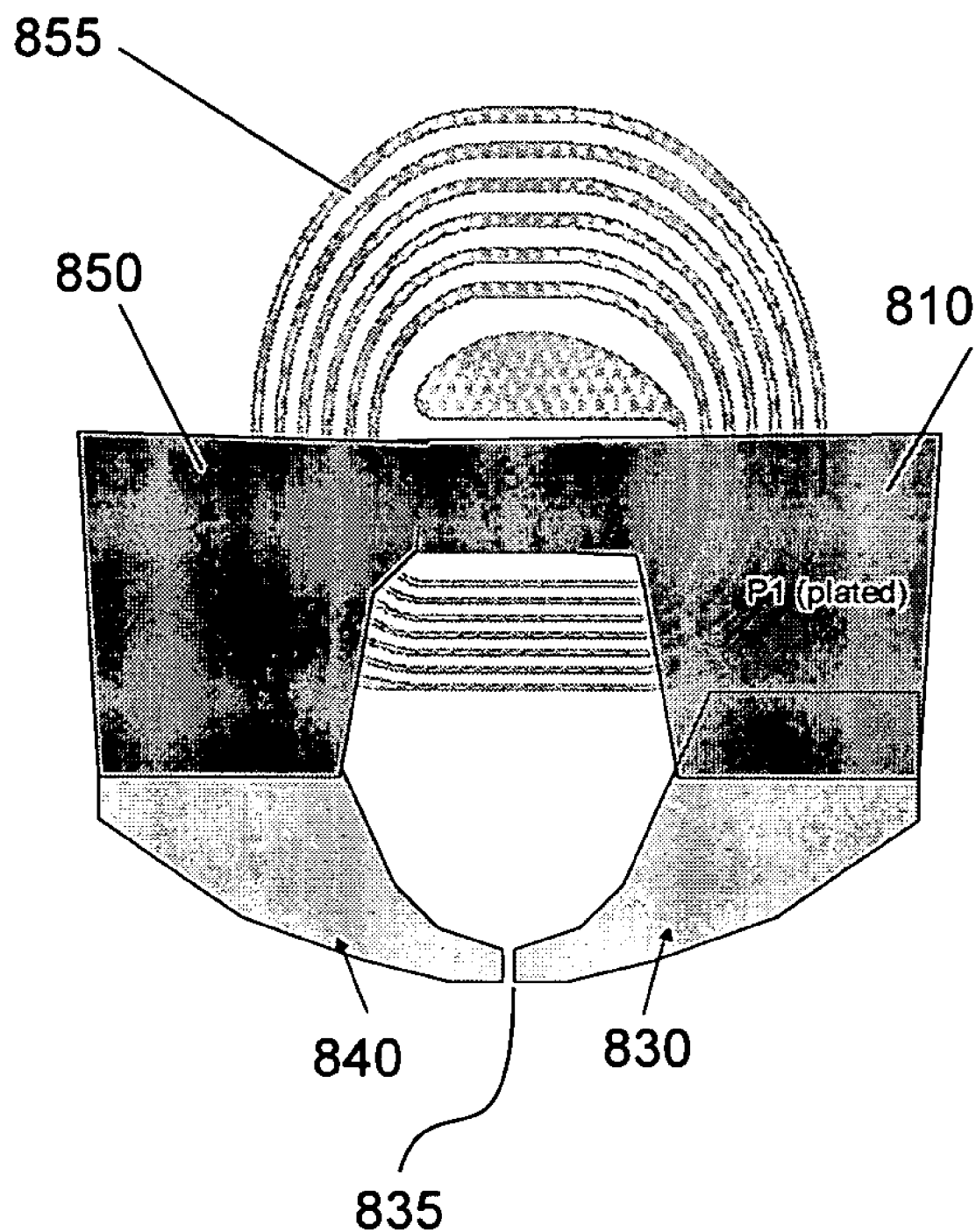

In FIG. 8c, the coil 855 is defined. In FIG. 8d, the second write pole or yoke 850 is then formed and electroplated to complete a magnetic circuit for the write head 800. The write head track width is defined by the thickness of the defined pole tips PT1 830 and PT2 840. In an alternative embodiment, the process for fabricating write head 800 is the same as above except that the pole tips PT1 830 and PT2 840 can be deposited first and then yoke 810 can be deposited and magnetically coupled to PT1 830. The layers of the write head in either embodiment can be deposited on a planar wafer surface.

Figure 9:
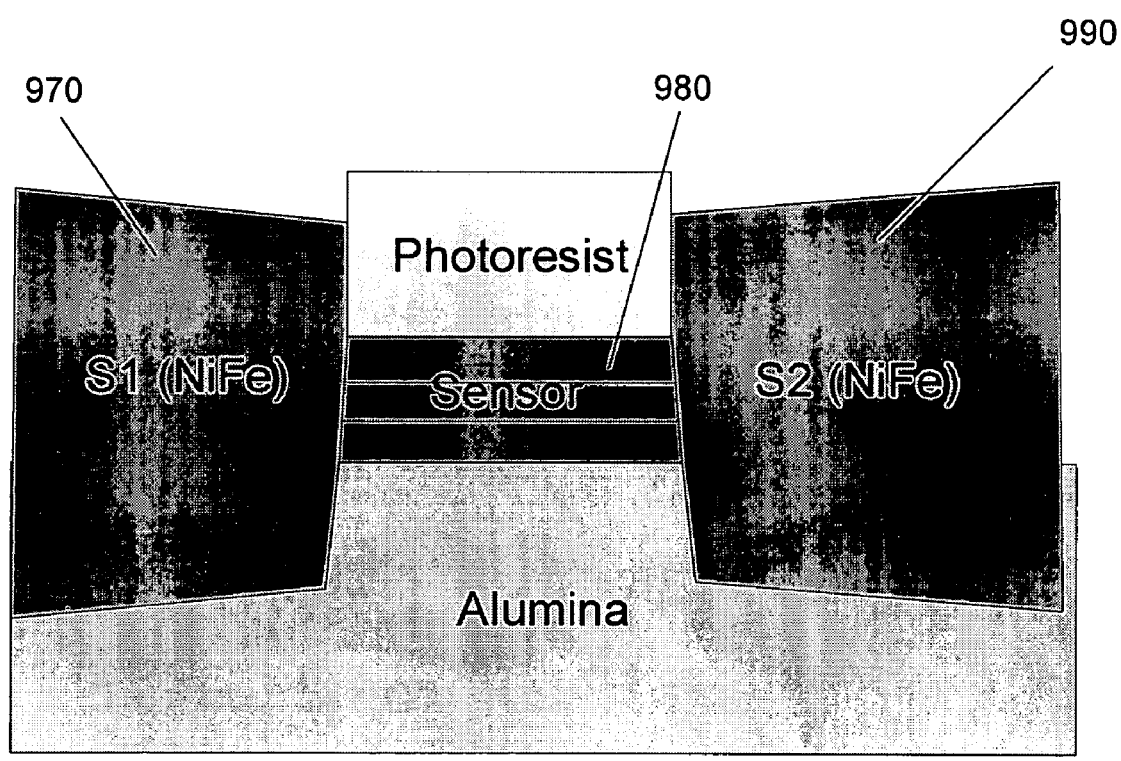
FIG. 9 illustrates fabrication of a read head that can be used in conjunction with the write head of FIGS. 8a-d according to an embodiment of the present invention.
Figure 10:
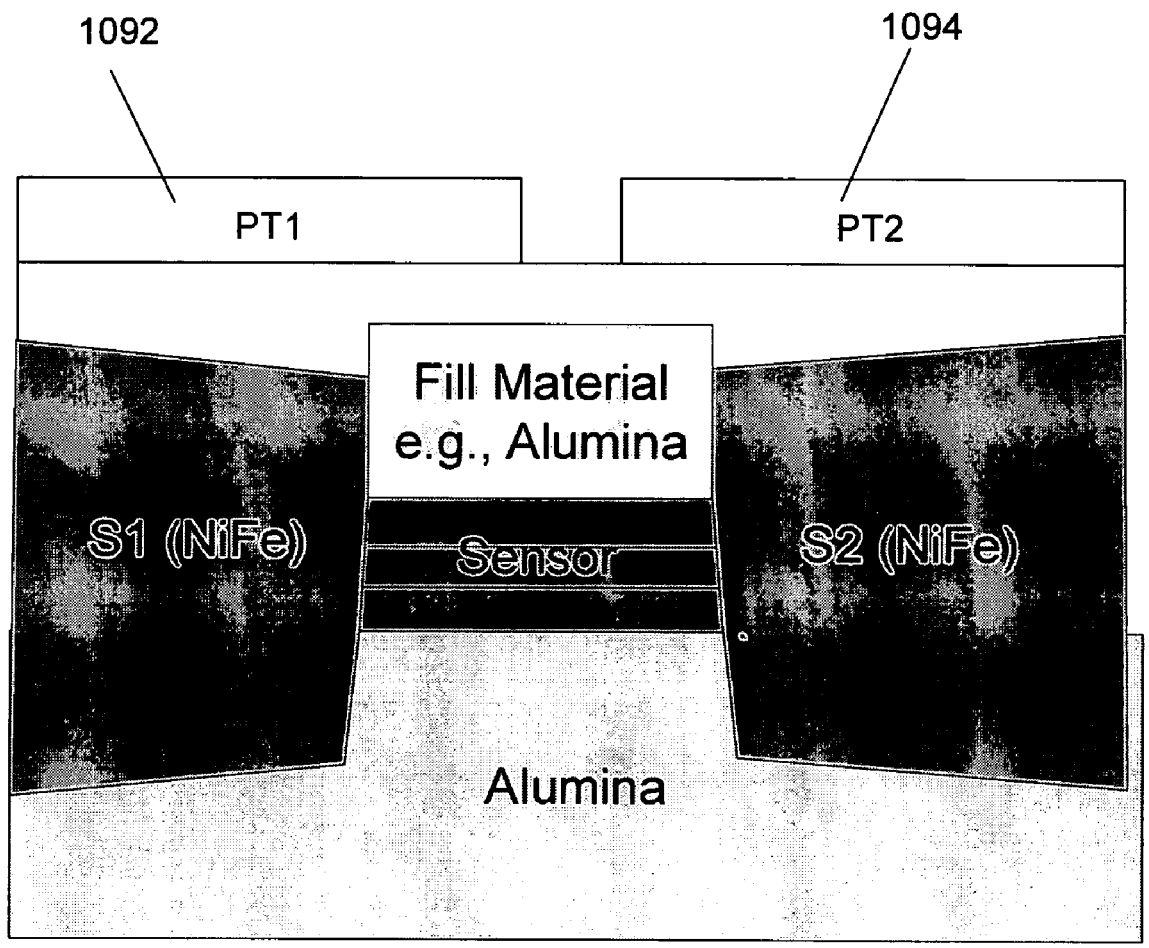
FIG. 10 shows the removal of the photoresist, depositing of a fill material such as alumina, and formation of pole tips.

FIG. 9a illustrates fabrication of a read head 900 that can be used in combination with a write head according to an embodiment of the present invention, including the embodiment described in FIGS. 8a-d. To make a functional read and write head using the above described write head, shields 970, 990 of a read head have to form a gap with the plane parallel to the write head write gap 835 shown in FIGS. 8b-d. In this embodiment, forming a read gap in a plane parallel to the write gap is achieved by rotating the read shields 970, 990. As a result, conventional shields S1 and S2 are not deposited. Rather, the sensor film 980 is deposited using conventional track definition techniques. The defined width of the sensor film 980 is set to a desired read gap. Ion milling is used to define the sensor, where the milling depth should be at least 0.2 um. Permalloy deposition forms both shield S1 970 and S2 990 rather than hard bias deposition. The permalloy layer, NiFe, forms S1 970 and S2 990 shields and can be used as electrical leads for the sensor. Additionally, a slight magnetic biasing can be applied to the shields to insure magnetic stability of the sensor. This is done by depositing hard bias on the outer edges of shield 1 and shield 2. The magnetic flux from the bias layer magnetizes the shields and is transmitted to the sensor free layer. FIG. 10 shows the removal of the photoresist, depositing of a fill material such as alumina, and formation of pole tips 1092, 1094.

Other embodiments of read heads can be implemented to make a functional read and write head in accordance with the present invention including a CPP configuration, MTJ or GMR (not shown). In this configuration conformal shields define the read gap. The MTJ or GMR sensor is then deposited and patterned followed by depositing the isolation layer and CMP-aided lift off exposes the top contact. The upper shield is subsequently deposited. The read head and write head are bonded together to form the read/write head.

Figure 11A:
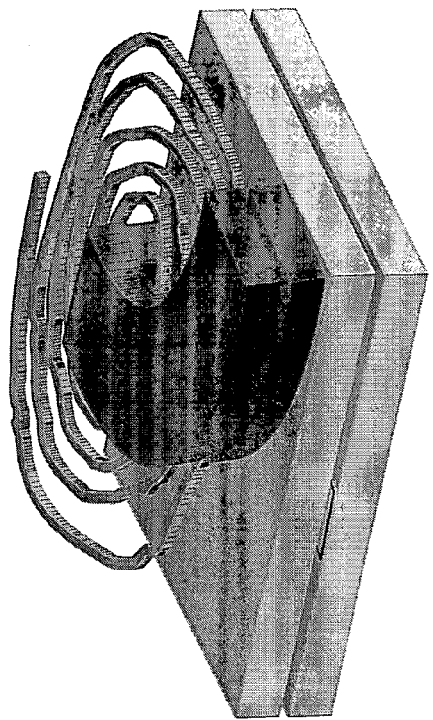
Figure 11A:
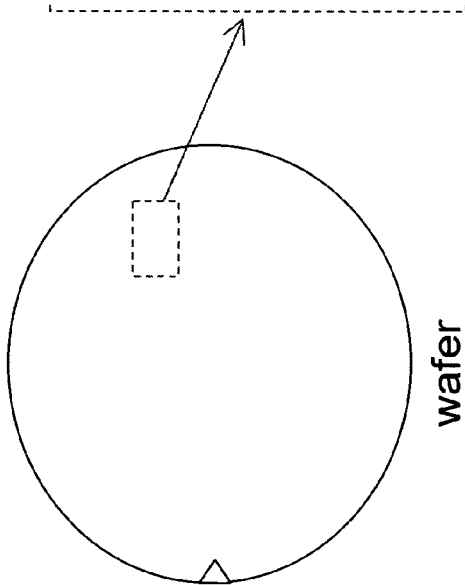
Figure 11B:
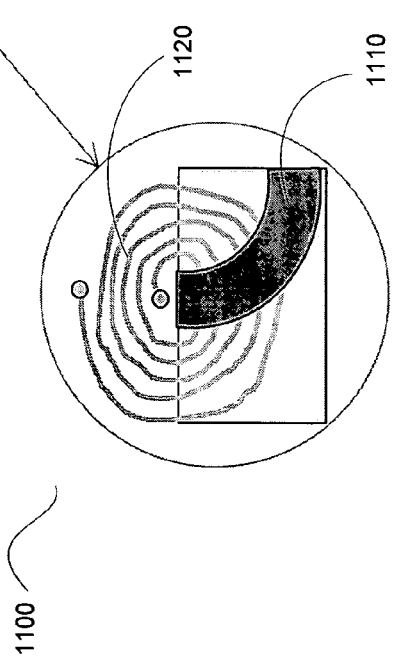
Figure 11F:
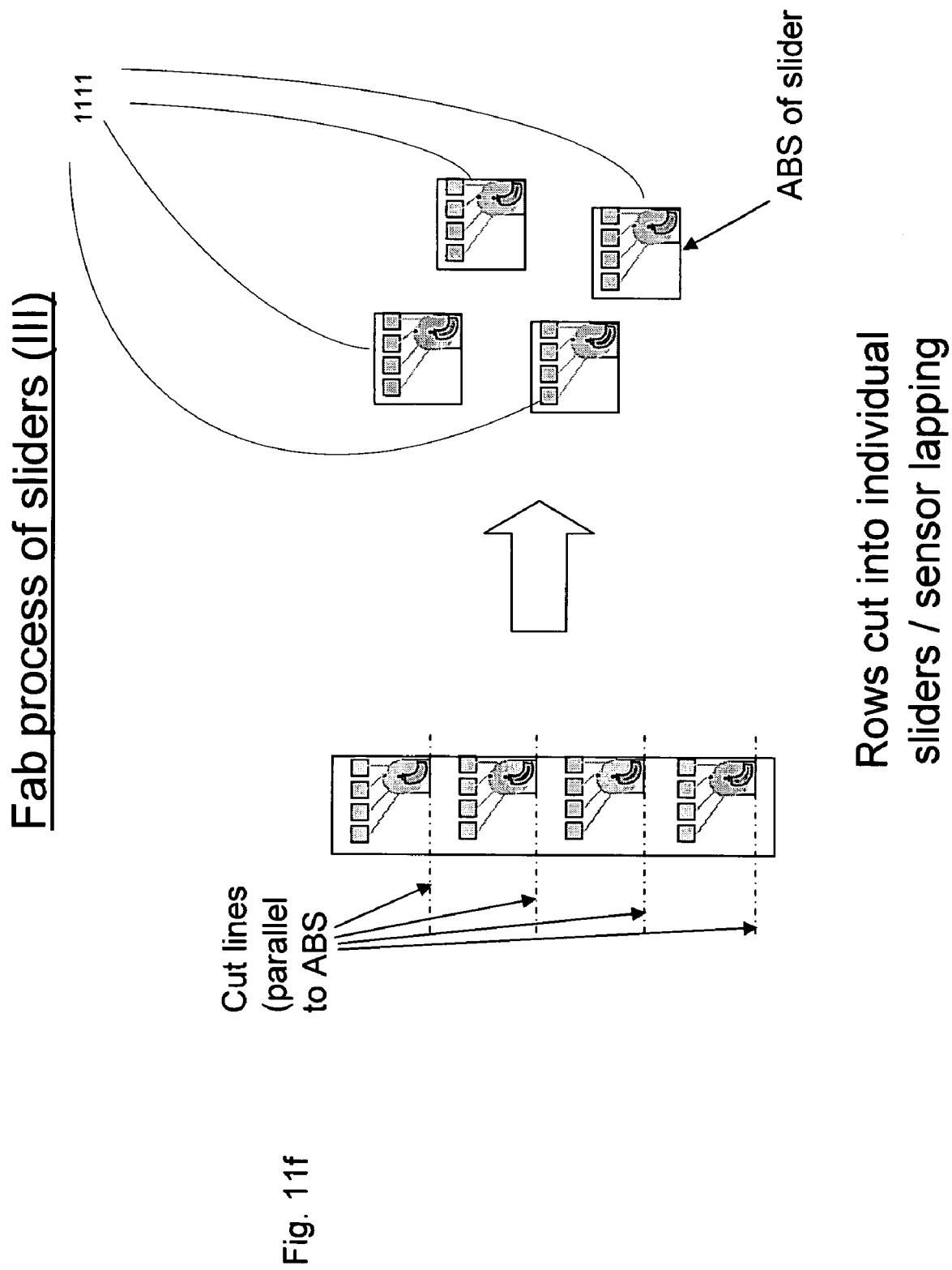

FIGS. 11a-f illustrates another method for fabricating a read/write head in accordance with embodiments of the invention. The read head is fabricated with read gap co-planar with the wafer. Write head 1100 is fabricated using methods that include forming a yoke 1110 and a coil 1120 on a planar wafer surface, FIGS. 11a and 11b. The planar wafer surface, shown in a blown-out view in FIG. 11a, holds multiple write heads. The wafer is processed using an alumina overcoat at connection pads for read and write heads. Note that pole tips have not been defined. After the wafer is finished, it is sliced in the direction perpendicular to the ABS surface so as to expose the legs of yoke 1110, see FIGS. 11b-c. The write heads are sliced into rows of sliders sliders, see FIG. 11c. In this embodiment, the head 1100 is located towards the edge of a slider 1111, see FIG. 11c, and the yoke 1110 is stretched so as to be exposed on the side after slider slicing. A group of the sliced rows are arranged together, FIG. 11d, and planarized using polishing tools. A magnetic CoFe film of the thickness equal to the desired P2B is deposited at this new surface of the joined planarized sliced slider and patterned using lithography to form pole tips PT1 1130 and PT2 1140 and ion milled to define write gap 1135 as shown in FIG. 11e, for example. Other processes for defining the write gap 1135 include E-beam lithography, focused ion beam, forming a bottom isolation layer to a desired gap thickness and vacuum depositing a write gap or forming a gap layer. Alignment marks can be defined during wafer build for the above photo step. The process described above can be used for a single slider, FIG. 11e, or can be used in fabricating multiple sliders in a row, FIG. 11c, or multiple sliders in a row glued together, FIG. 11d.

Embodiments of the present invention allow for tight P2B distribution and mean control, symmetric poles P1 and P2 to improve transition curvature, reduce erase bands, and avoid pole saturation. Defining write head geometries lithographically allows for more precision for components such as P2T, flare angle and throat height. P1A and P2B are identical. Furthermore, a better choice of magnetic materials such as vacuum-deposited materials having better magnetic and corrosion properties is available.

Embodiments of the invention can be applied to longitudinal recording heads and to perpendicular recording heads. The methods taught in the present application have many advantages in making advanced perpendicular recording heads with complex structures. For example, shield-pole can optimize field gradient and orientation, and detached pole tips can eliminate pole tip remnants.

In all embodiments of the instant application, the most critical step is defining the write track width. Because this invention allows one to use thin films, and the write track width can be defined solely by film thickness, the pole tip width can be well defined using photolithography and ion milling. Alternatively, E-beam lithography can be used, or, a FIB can be used to slice the write gap in the deposited film. Additionally, the following process can be used: the PT2 (CoFe) is defined using deposition/photolithography/ion milling with the bottom isolation layer of the same thickness of gap; then the gap is vacuum deposited, following by deposition of PT1 (CoFe); finally, PT1 layer is chemically mechanically polished with the gap layer serving as the stopping layer.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for making coplanar write head pole tips, comprising:
    forming a magnetic thin-film write head pole tip layer on a planar wafer surface;
    defining a first planar pole tip and a second planar pole tip from the pole tip layer, a gap formed between the first planar pole tip and the second planar pole tip defining a track width; and
    forming a read head having a first shield and a second shield configured to form a gap therebetween that is parallel to the gap formed between the first planar pole tip and the second planar pole tip by forming a read gap perpendicular to the first and second planar pole tips.

2. The method of claim 1, wherein forming the magnetic thin-film write head pole tip layer comprises vacuum-depositing the magnetic thin-film write head pole tip layer on the planar wafer surface.

3. The method of claim 1, wherein forming the magnetic thin-film write head pole tip layer comprises forming the magnetic thin-film write head pole tip layer at least partially adjacent to and magnetically coupled to a first side of a yoke.

4. The method of claim 3, wherein the first side of the yoke is electroplated.

5. The method of claim 4 further comprising electroplating a second side of the yoke to complete a magnetic circuit for a write head.

6. The method of claim 1 further comprising electroplating a first side of a yoke adjacent to and magnetically coupled to one of the first and second planar pole tips.

7. The method of claim 1, wherein defining the first and second planar pole tips from the pole tip layer comprises defining at least one of the first planar pole tip and the second planar pole tip using photolithography.

8. The method of claim 1, wherein defining the first and second planar pole tips from the pole tip layer comprises defining at least one of the first planar pole tip and the second planar pole tip using chemical mechanical polishing.

9. A method for making a coplanar magnetic write head, comprising:
    magnetically coupling a thin-film magnetic write head pole tip layer to a yoke formed on a planar wafer surface;
    defining a first and second planar pole tip from the pole tip layer; and
    defining a write gap between the first and second planar pole tips formed from the pole tip layer, the write gap formed between the first planar pole tip and the second planar pole tip defining a track width; and
    forming a read head having a first shield and a second shield configured to form a gap therebetween that is parallel to the write gap by forming a read gap perpendicular to the first and second planar pole tips.

10. The method of claim 9, wherein the yoke is a planarized sliced slider.

11. The method of claim 10, wherein the sliced slider is sliced perpendicular to an air bearing surface, a portion of the sliced slider perpendicular to the air bearing surface having the yoke exposed.

12. The method of claim 9, wherein the yoke comprises a prefabricated yoke formed on the planar wafer surface.

13. The method of claim 9, wherein defining the write gap comprises defining the write gap using photolithography and ion milling.

14. The method of claim 9, wherein defining the write gap comprises defining the write gap using E-beam lithography.

15. The method of claim 9, wherein defining the write gap comprises defining a write gap using a focused ion beam.

16. The method of claim 9, wherein defining the write gap comprises: forming a bottom isolation layer to a desired gap thickness; and vacuum depositing the write gap.

* * * * *